US006868664B2

(12) United States Patent
Albero et al.

(10) Patent No.: US 6,868,664 B2
(45) Date of Patent: Mar. 22, 2005

(54) MAIN PROPULSION ENGINE SYSTEM INTEGRATED WITH SECONDARY POWER UNIT

(75) Inventors: Jose Albero, Lachenaie (CA); Richard Dussault, St-Lambert (CA); Robert G. Thompson, San Diego, CA (US); Patrick Germain, Outremont (CA); Michael K. Sahm, Avon, CT (US); Eric Tremaine, Longueuil (CA)

(73) Assignee: United Technologies Corporation, Hartford, CT (US)

( * ) Notice: Subject to any disclaimer, the term of this patent is extended or adjusted under 35 U.S.C. 154(b) by 30 days.

(21) Appl. No.: 10/015,439

(22) Filed: Dec. 13, 2001

(65) Prior Publication Data

US 2004/0211166 A1 Oct. 28, 2004

(30) Foreign Application Priority Data

Dec. 22, 2000 (CA) .............................................. 2329555

(51) Int. Cl.[7] .............................................. F02K 11/00
(52) U.S. Cl. ........................ 60/224; 60/226.1; 60/39.35
(58) Field of Search ............................... 60/39.15, 224, 60/225, 226.1, 287, 288

(56) References Cited

U.S. PATENT DOCUMENTS

| 2,601,194 A | 6/1952 | Whittle |
| 2,619,795 A | 12/1952 | Drake |
| 2,704,434 A | 3/1955 | Schmitt |
| 2,968,920 A | 1/1961 | Wayne et al. |
| 3,368,352 A | 2/1968 | Hewson |
| 4,149,374 A | * 4/1979 | Barchenko .................... 60/225 |
| 4,183,211 A | * 1/1980 | Menioux ...................... 60/224 |
| 4,248,041 A | * 2/1981 | Wilde et al. ................ 60/226.1 |
| 4,357,796 A | 11/1982 | Ellis |
| 5,137,230 A | 8/1992 | Coffinberry |
| 5,349,814 A | * 9/1994 | Ciokajlo et al. ........... 60/226.1 |
| 5,490,645 A | 2/1996 | Woodhouse |

* cited by examiner

Primary Examiner—Louis J. Casaregola
(74) Attorney, Agent, or Firm—Bachman & LaPointe, P.C.

(57) ABSTRACT

A main engine mounted auxiliary power unit comprises an auxiliary power unit integrated with a primary gas turbine engine into a single power plant suited for aircraft applications. The auxiliary power unit can be mounted within an engine core compartment of the main engine or at the main engine aft center body. The integration of the auxiliary power unit provides for installation and certification cost savings to the airframer by eliminating the need for mounting an auxiliary power unit to the tail section of the aircraft.

32 Claims, 3 Drawing Sheets

US 6,868,664 B2

MAIN PROPULSION ENGINE SYSTEM INTEGRATED WITH SECONDARY POWER UNIT

BACKGROUND OF THE INVENTION

1. Field of the Invention

The present invention relates to a power plant suitable for aircraft and, more particularly, to a new power plant arrangement wherein a secondary power unit is integrated within a main propulsion system of an aircraft or the like.

2. Description of the Prior Art

It is well known to mount an auxiliary power unit in the tailcone section of an aircraft to supply pressurized air for environmental control systems or main engine starting, and shaft horsepower to drive accessories such as an electric generator while the aircraft is on the ground and the main propulsion engines thereof are shutdown. In flight, the auxiliary power unit is typically shut off. However, auxiliary power units are occasionally used in flight, for instance, in the event of a main engine generator malfunction.

Such a tail mounted auxiliary power unit is commonly considered to be a low-utilization device that adds weight and complexity to the airplane while providing little operational benefits during most flight conditions.

SUMMARY OF THE INVENTION

It is therefore an aim of the present invention to simplify the installation of a secondary power unit by integrating it with a main engine into a single power plant.

It is also an aim of the present invention to provide installation and certification cost savings to airframers by eliminating the tailcone auxiliary power unit installation.

It is a further aim of the present invention to improve the performances of an aircraft secondary power unit during flight conditions.

Therefore, in accordance with the present invention, there is provided a power plant for a vehicle, comprising a nacelle cowl and a primary gas turbine engine mounted within said nacelle cowl and forming therewith a main vehicle propulsion system, and a secondary power system integrated to said main vehicle propulsion system for providing auxiliary power to the vehicle.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

As will be seen hereinafter, the present invention is generally directed to a new aircraft power plant, whereby a pair of secondary power units can be integrated into respective main aircraft propulsion engines in replacement of a conventional auxiliary power unit, which is typically separately mounted to the airframe of the aircraft at the tail section thereof.

Figure 1:
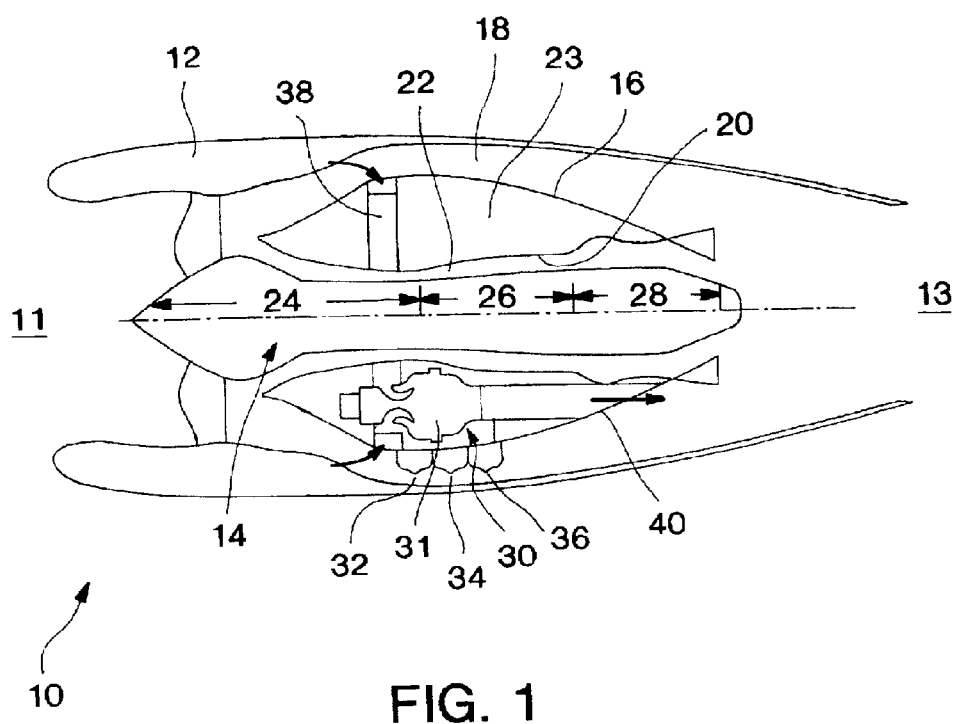
FIG. 1 is a schematic side view of an aircraft power plant wherein an auxiliary power unit is mounted in a core compartment of a main propulsion engine in accordance with a first embodiment of the present invention.

FIG. 1 illustrates a first embodiment of such a new aircraft power plant 10. The power plant 10 comprises a nacelle cowl 12 having an inlet end 11 and an exhaust nozzle end 13, and a main propulsion engine 14 housed within the nacelle cowl 12. An inner core cowl 16 is concentrically mounted within the nacelle cowl 12 about the main propulsion engine 14. The inner core cowl 16 and the nacelle cowl 12 define therebetween an annular by-pass passage 18.

The main propulsion engine 14 has a casing assembly 20 defining an annular core flow passage 22. The casing assembly 20 defines with the inner core cowl 16 an engine core compartment 23 in which various components can be received.

The main propulsion engine 14 consists of a gas turbine engine having a compressor section 24 which typically includes a fan (not shown) and a high pressure compressor (not shown), a combustion section 26 and a turbine section 28, as is well known in the art. In operation, the gas turbine engine inducts ambient air via the inlet end 11. A portion of the air is diverted into the by-pass passage 18 and discharged at the exhaust nozzle 13. Before being directed into the by-pass passage 18, the air is compressed in the compressor section 24 of the gas turbine engine. The other portion of the air, which is drawn into the nacelle cowl 12, is caused to flow through the core flow passage 22. The air flowing through the core flow passage 22 is compressed in the compressor section 24 and is then directed to the combustion section 26 where it is mixed with fuel and ignited. The combustion gases from the combustion section 26 are then delivered to the turbine section 28 for driving the compressors (not shown) of the compressor section 24 and the engine accessories (not shown). The expanded gases from the turbine section 28 are discharged through the exhaust nozzle end 13 with the air emanating from the bypass passage 18.

As seen in FIG. 1, a secondary power unit 30 is mounted within the engine core compartment 23 instead of being mounted to the aircraft tail section as is conventionally done. According to the illustrated embodiment, the secondary power unit 30 consists of an auxiliary power unit of the type used for providing pneumatic air to loads, such as the aircraft passenger cabin, electrical power to the aircraft, and starting the main propulsion engine 14 pneumatically, while the aircraft remains stationary on the ground. However, it is understood that the secondary power unit 30 could consist of various types of multifunction power unit having a gas turbine engine section. For instance, the secondary power unit could consist of an auxiliary power unit having an environmental control system (ECS), such as an air cycle machine. The secondary power unit 30 could also consist of a multifunction power unit integrating an auxiliary power unit (APU), an emergency power unit (EPU), an environmental control system (ECS) and an engine start system (ESS).

The secondary power unit 30 includes a secondary gas turbine engine 31 having a compressor section 32, a combustion section 34 and a turbine section 36. As seen in FIG. 1, a radial inlet plenum 38 can be provided for allowing air to be drawn from the by-pass passage 18 directly into the gas turbine engine 31. The radial inlet plenum 38 could be provided in the form of a ring member defining a number of air passages extending radially through the engine core compartment 23 to convey air from the by-pass passage 18 to the secondary gas turbine engine 31. The secondary gas turbine engine 31 includes an axial exhaust outlet 40 for directing the expanded gases from the gas turbine section 36 back into the by-pass passage 18.

During ground operation, the inlet air is drawn in through the stationary fan of the primary gas turbine engine and the exhaust nozzle 13, then through the by-pass passage 18 and finally into the secondary gas turbine engine 31 before being discharged back into a aft portion of the by-pass passage 18. In flight, the secondary gas turbine engine inlet flow is boosted by the main propulsion engine fan, as it is compressed thereby before entering into the secondary gas turbine engines 31. This provides for a better secondary gas turbine engine fuel burn when operated at altitude. Aircraft pneumatic and electric power demand is typically provided on the ground by the secondary power unit 30 and by the main engine 14 during flight conditions.

A closure member (not shown) displaceable between closed and open positions can be provided for selectively preventing air from being drawn into the secondary gas turbine engine 31, while the main engine 14 is being operated. However, due to the inlet boost from the main engine fan, the performances of the secondary power unit 30 are improved as compared to a traditional tail mounted auxiliary power unit and, thus, the secondary power unit 30 could be operated at all time, thereby replacing the engine bleed requirement and eliminating the need for a closure member.

By integrating the secondary power unit 30 to the power plant 10 and, thus, eliminating the tailcone auxiliary power unit installation, significant installation and certification cost savings can be achieved for the airframers. This is also advantageous in that it eliminates the need for an aircraft fire zone and APU containment issues on tail plane, increases the cargo space, reduces pneumatic/hydraulic/and fuel lines, and also allows for structural cost and weight savings.

The positioning of the secondary power unit 30 into the nacelle cowl 12 also provides for better main engine cold start capabilities due to the secondary power unit 30 pre-heating effect of the main engine core compartment 23. Indeed, while being operated, the secondary power unit 30 will generate heat that will contribute to warm up the various components of the main engine 14.

The re-light characteristics of the secondary power unit 30 will also be improved in flight due to the inlet boost, the ram air, and the pre-heating thereof by the heat generated by the main engine 14.

In a wing-mounted application, the integration of the secondary power unit 30 with the main propulsion engine 14 into a single power plant will eliminate the need for costly pneumatic piping.

FIGS. 2 to 5 illustrate various possible inlet and outlet configurations for the secondary gas turbine engine 31.

Figure 2:
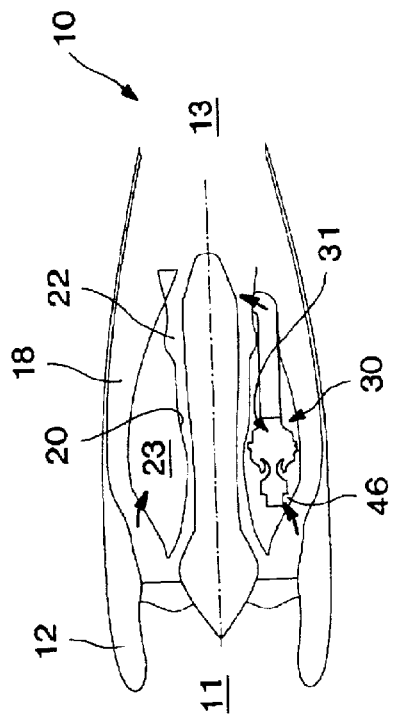
FIGS. 2 to 5 are schematic side views illustrating different possible inlet and exhaust configurations for a main engine core mounted auxiliary power unit.

As shown in FIG. 2, an axial inlet 42 could be defined in the engine core compartment 23 for directing air from the by-pass passage 18 directly into the secondary gas turbine engine 31.

Figure 3:
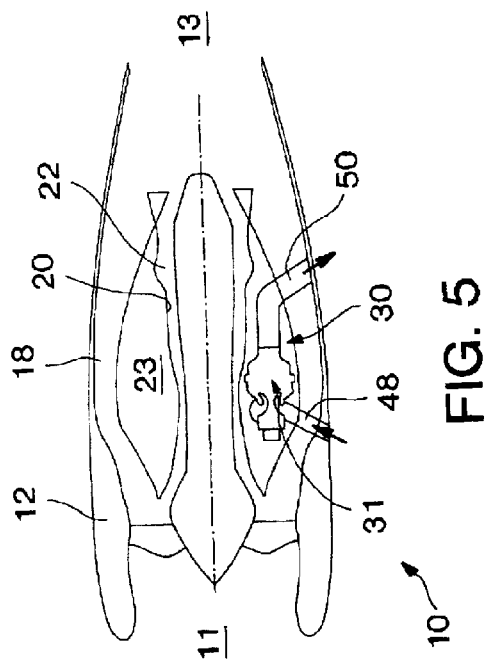

Alternatively, as shown in FIG. 3, a "chin" type inlet 44 could be defined in the engine core compartment 23 to direct air from the by-pass passage 18 into the secondary gas turbine engine 31.

Figure 4:
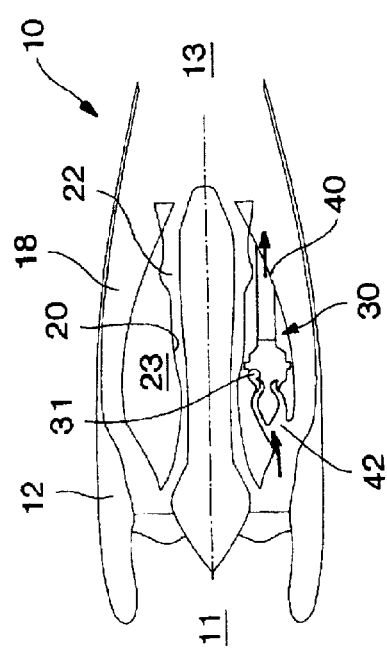

The secondary gas turbine engine 31 could also be provided with a radial inlet 46 for receiving air from the engine core compartment 23 instead of from the by-pass passage 18, as shown in FIG. 4.

Figure 5:
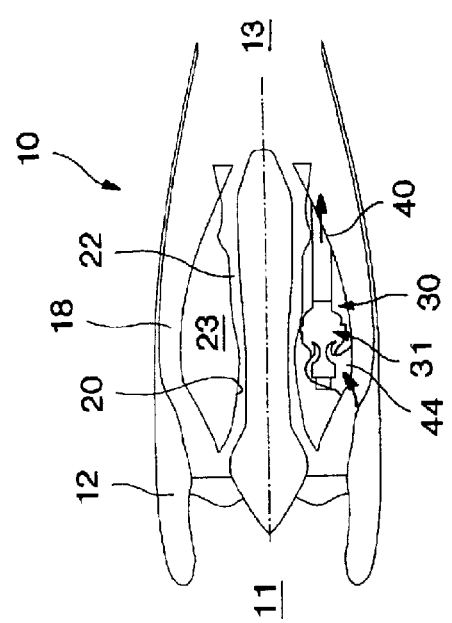

Finally, a hollow inlet strut 48 could extend across the by-pass passage 18 and through the nacelle cowl 12 to allow ambient air to be drawn radially into the secondary gas turbine engine 31, as shown in FIG. 5.

As shown in FIG. 4, the expanded gases leaving the secondary gas turbine engine 31 could be directed into the main engine exhaust instead of into the by-pass passage 18.

Finally, the expanded gases leaving the secondary gas turbine engine 31 could be directed overboard to the ambient air via a hollow outlet strut 50 extending across the by-pass passage 18 and through the nacelle cowl 12.

It is noted that the inlet and exhausts configurations are interchangeable.

Figure 6:
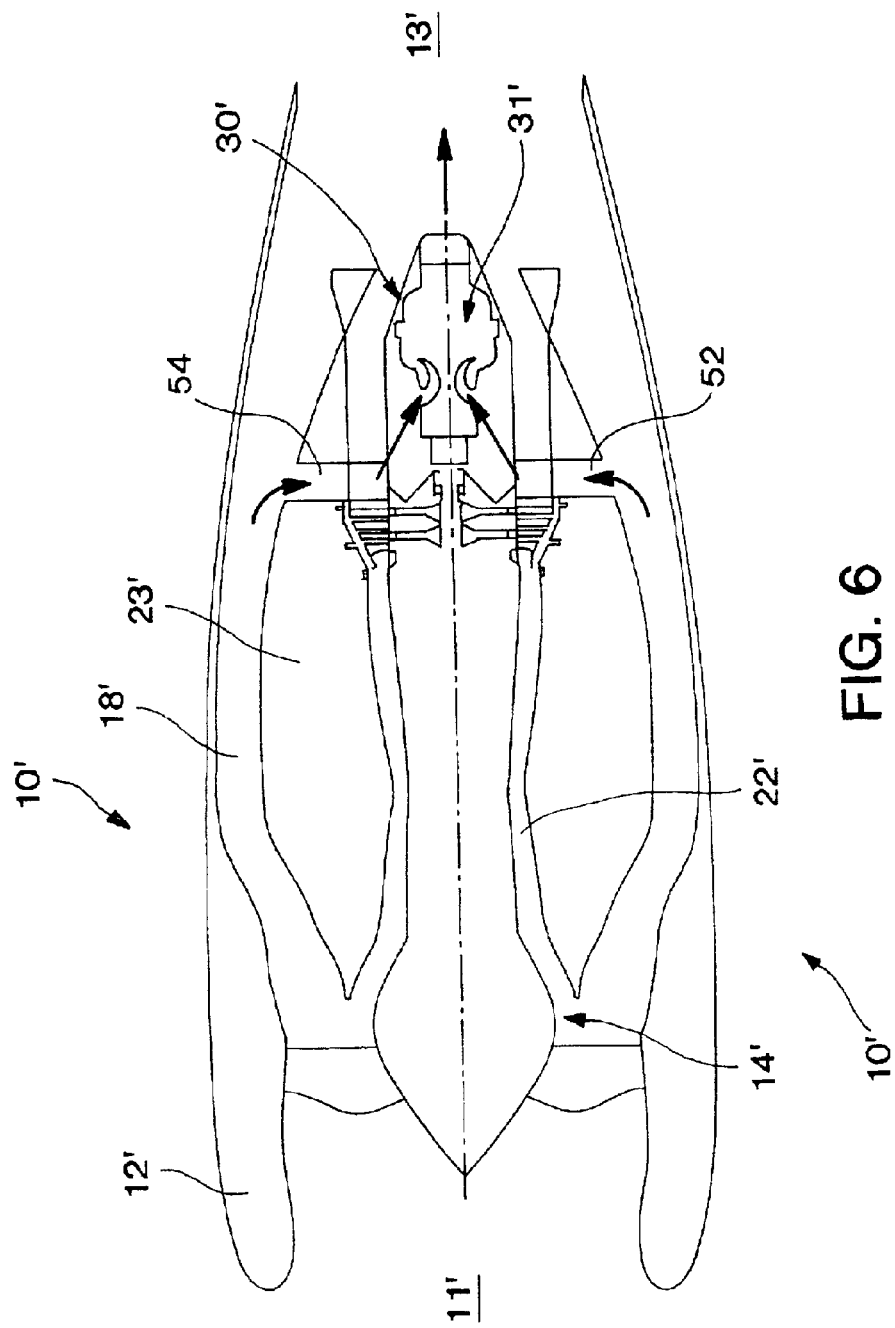
FIG. 6 is a schematic side view of an aircraft power plant wherein an auxiliary power unit is mounted to the aft center body of the main propulsion engine in accordance with a further embodiment of the present invention.

FIG. 6 illustrates a further embodiment of the present invention, which only differs from the one illustrated in FIG. 1, by the location of the secondary power unit 30. Indeed, instead of being integrated in the engine core compartment 23', the secondary power unit 30' is mounted within the main engine aft center-body. According to this arrangement, the by-pass passage 18' constitutes the air inlet source for the secondary power unit 30'. During ground operation, the inlet air is drawn through the stationary fan and the exhaust nozzle 13' of the primary gas turbine engine, then through the by-pass passage 18 and a nacelle inlet 52 connected in fluid flow communication with turbine exhaust struts 54 and finally into the secondary gas turbine engine 31' of the secondary power unit 30'. In flight, the air flowing to the secondary gas turbine engine 31' has already been compressed by the main engine fan and as a result the performances of the secondary gas turbine engine 31' are improved.

It is noted that the present integration concept applies to either long (Long Duct Mixed Flow) or short cowl (Short Duct Separate Flow) nacelle configurations and is thus not limited to the particular type of nacelle cowl illustrated in the drawings.

What is claimed is:

1. A power plant comprising:
    a nacelle cowl having an inlet end and an exhaust end;
    a primary gas turbine engine mounted within said nacelle cowl;
    said primary engine having a core compartment;
    secondary power means for providing pneumatic air to at least one load;
    said secondary power means being positioned within the core compartment;
    a by-pass passage positioned between said nacelle cowl and said core compartment; and
    said primary engine drawing air into said inlet end and a first portion of said air being diverted into said by-pass passage and a second portion of said air entering said primary engine.

2. A power plant according to claim 1, further comprising:
    an inner core cowl being concentrically mounted within said nacelle cowl about the primary gas turbine engine; and
    said by-pass passage comprising an annular by-pass passage extending between said nacelle cowl and said inner core cowl.

3. A power plant comprising:
    a nacelle cowl having an inlet end and an exhaust nozzle end;
    a primary gas turbine engine mounted within said nacelle cowl;

said primary gas turbine engine having a core compartment;

secondary power means for providing pneumatic air to at least one load;

said secondary power means being positioned within the core compartment;

an inner core cowl being concentrically mounted within said nacelle cowl about the primary gas turbine engine;

an annular by-pass passage extending between said nacelle cowl and said inner core cowl; and said secondary power means having inlet means for drawing a fluid from said by-pass passage into said secondary power means.

4. A power plant according to claim 3, wherein said inlet is an axial inlet.

5. A power plant according to claim 3, wherein said inlet means comprises a radial inlet plenum.

6. A power plant according to claim 5, wherein said radial inlet plenum comprises a ring member defining a number of air passages extending radially through the core compartment.

7. A power plant according to claim 3, further comprising said secondary power means having outlet means for directing expanded gases into said by-pass passage.

8. A power plant according to claim 3, further comprising a closure member movable between a first position where fluid from said by-pass passage is drawn into said inlet means and a second position where fluid from said by-pass passage is prevented from being drawn into said inlet means.

9. A power plant according to claim 1, wherein said primary gas turbine engine has a compressor section, a combustion section, and a turbine section.

10. A power plant according to claim 1, wherein said secondary power means comprises an auxiliary power unit for providing pneumatic air to said at least one load.

11. A power plant according to claim 10, wherein said auxiliary power unit comprises means for starting said primary gas turbine engine.

12. A power plant according to claim 1, wherein said secondary power means comprises a gas turbine engine.

13. A power plant according to claim 1, wherein said secondary power means comprises an auxiliary power unit having an environmental control system.

14. A power plant according to claim 1, wherein said secondary power means comprises a power unit which integrates an auxiliary power unit, an energy power unit, an environmental control system, and an engine start system.

15. A power plant according to claim 1, wherein said secondary power means comprises means for heating said primary gas turbine engine.

16. A power plant according to claim 1, further comprising said secondary power means having an inlet for receiving air from said core compartment.

17. A power plant according to claim 1, further comprising a hollow member for allowing ambient air to be drawn into said secondary power means.

18. A power plant according to claim 1, further comprising a hollow member extending from an outlet end of said secondary power means for directing expanded gas to an ambient environment.

19. A power plant according to claim 1, further comprising:

an inner core cowl being concentrically mounted within and located radially inward of said nacelle cowl about the primary gas turbine engine; and said by-pass passage comprising an annular by-pass passage extending between said nacelle cowl and said inner core cowl.

20. A power plant for an aircraft, the power plant comprising:

a nacelle having an inlet end, an exhaust end and a by-pass passage defined inside the nacelle;

a gas turbine engine mounted in the nacelle for providing motive thrust to the aircraft; and a secondary power generation unit mounted inside the nacelle, said secondary power generation unit being adapted to provide at least one of pneumatic air and electrical power to an aircraft accessory system and having an inlet for drawing a fluid into said secondary power generation unit from the by-pass passage, wherein the gas turbine engine and said secondary power generation unit are mounted non-concentrically adjacent one another in the nacelle.

21. A power plant according to claim 20, wherein said inlet is an axial inlet.

22. A power plant according to claim 20, wherein said inlet comprises a radial inlet plenum.

23. A power plant according to claim 20, further comprising said secondary power generation unit has an outlet for directing expanded gases into the by-pass passage.

24. A power plant according to claim 20, further comprising a closure member movable between a first position where fluid from said by-pass passage is drawn into said inlet and a second position where fluid from said by-pass passage is prevented from being drawn into said inlet.

25. A power plant according to claim 20, wherein said secondary power generation unit comprises a gas turbine engine.

26. A power plant according to claim 20, wherein said secondary power generation unit comprises an auxiliary power unit.

27. A power plant for an aircraft, the power plant comprising:

a nacelle having an inlet end, an exhaust end and an annular by-pass passage defined inside the nacelle;

a thrust producing gas turbine engine core located radially inside the annular by-pass passage; and a secondary power unit located radially inside the annular by-pass passage and next to the engine core, said secondary power unit providing non-propulsive power to the aircraft.

28. A power plant according to claim 27, wherein said secondary power unit is located between said by-pass passage and said engine core.

29. A power plant according to claim 27, wherein said secondary power unit has an inlet for drawing a fluid from said by-pass passage into said secondary power unit.

30. A power plant according to claim 27, wherein said secondary power unit has an outlet for directing expanded gases into the by-pass passage.

31. A power plant according to claim 27, wherein said secondary power unit comprises a gas turbine engine.

32. A power plant according to claim 27, wherein said secondary power unit comprises an auxiliary power unit.

* * * * *